United States Patent [19]

David, Jr.

[11] Patent Number: 4,728,157

[45] Date of Patent: Mar. 1, 1988

[54] EJECTABLE AUDIO COMPACT DISC CASE

[76] Inventor: Felix David, Jr., 326 Gifford Pl., Teaneck, N.J. 07666

[21] Appl. No.: 786,302

[22] Filed: Oct. 10, 1985

[51] Int. Cl.$^4$ .......................... A47B 81/06; G11B 1/02
[52] U.S. Cl. ........................................ 312/12; 312/15
[58] Field of Search ....................... 312/12, 15, 16, 18, 312/19; 211/40; 206/387, 307

[56] References Cited

U.S. PATENT DOCUMENTS

| | | | |
|---|---|---|---|
| 1,056,835 | 3/1913 | Robbins | 312/12 X |
| 1,242,550 | 10/1917 | Heitman | 312/12 X |
| 1,288,229 | 12/1918 | Scott | 312/15 |
| 1,297,160 | 3/1919 | Heitman | 312/12 X |
| 1,327,142 | 1/1920 | Call | 312/16 |
| 4,108,511 | 8/1978 | Spragg, Jr. | 312/12 X |
| 4,331,242 | 5/1982 | Scott | 211/40 |
| 4,511,194 | 4/1985 | Park et al. | 312/12 |

FOREIGN PATENT DOCUMENTS 285688  5/1914  Fed. Rep. of Germany ........ 312/15

Primary Examiner—Peter A. Aschenbrenner
Attorney, Agent, or Firm—Thomas R. Morrison

[57] ABSTRACT

A disc holder comprises a rigid box which is solid on five of its six sides. The sixth side is hinged on one end thereof to a first side, either the top or the bottom, of the compact disc holder. A spindle is mounted within the rigid box and along a track therein. The spindle is configured so as to conform to a hole at the center of the disc to be held. Upon actuation of a linear actuator, a first gear, coupled to the spindle, is rotated, thereby causing the spindle to proceed in a first direction along the track, past the sixth side of the rigid box, and to the exterior thereof. When the spindle reaches a predetermined point relative to the exterior of the rigid box, it retracts slightly, releasing the disc held thereby, so that the disc may be removed and used, as desired.

7 Claims, 5 Drawing Figures

EJECTABLE AUDIO COMPACT DISC CASE

BACKGROUND OF THE INVENTION

The present invention relates to a holder for discs, and, more particularly, to a holder for compact audio discs which can be operated with one hand.

Compact disc players are relatively new devices for recording and playing music. They provide high quality audio output, and combine that output with a small size, and so are becoming increasingly popular for use in applications where a small size is of particular desirability. One such application is in automobiles.

Placing compact disc players in automobiles has given rise to a problem, however, namely providing holders or cases for compact discs which may be opened easily with one hand by a driver while driving. Conventional holders for compact discs comprise a shallow flat box formed of two hinged flat portions. The bottom half portion has a gripping spindle at its center for gripping a hole at the center of the disc. The disc is retained within a circular recess in the bottom half portion and gripped by the gripping spindle to prevent movement. The top half portion is simply a lid hinged to the bottom half portion.

The drawback of such conventional compact disc holders is that they are quite difficult to open with one hand, and it is also difficult to remove the compact disc from the holder once it is opened. Both difficulties stem from the fact that the conventional holder is, in sum, nothing more than a hinged box, in which the compact disc is retained.

To remove the disc from this conventional holder, it is necessary to open the lid manually and remove the disc from the gripping spindle. Such handling can be cumbersome to negotiate with one hand, and usually results in smudging the surface of the disc. While the lasers used to play the discs are capable of reading through a smudge mark, accumulations of dirt and grime on the disc may lead to its eventual corrosion or deterioration, so that it is desirable to minimize manual handling of the disc.

If a driver is driving his car, and wishes to play a compact disc on a compact disc player, he must, while keeping one hand on the wheel, flip open the hinge of the holder and remove therefrom the compact disc. Due to the manner in which the compact disc is retained in the holder, this can be difficult to negotiate while driving.

Thus, there is a need for a compact disc holder which can be easily opened with one hand, and from which a compact disc may be easily removed with one hand, and preferably ejected directly into the compact disc player.

Additionally, the conventional hinged box-type compact disc holder has no affirmative latching mechanism, so that the holder, if dropped, may fall open and thereby permit the compact disc to slip therefrom. When driving, this may be a particular problem, since the driver will tend to keep his eyes on the road, rather than on the operation of the holder. Any mishandling of the holder, such as dropping it, could lead to the slippage therefrom of the compact disc. Thus, there is a further need for a compact disc holder which may be affirmatively latched, to prevent any undesired release of the compact disc.

Accordingly, it is an object of the invention to provide a compact disc holder which overcomes the drawbacks of the prior art.

It is another object of the invention to provide a compact disc holder which contains an ejector mechanism for ejecting a contained disc, the ejector mechanism being actuated in a one-handed operation.

Another object of the invention is the provision of a compact disc holder of the character described in which the disc is stored in a suspended position between the top and bottom walls of the holder so that the playing surfaces of the disc do not engage the inner surfaces of the holder.

It is a further object of the invention to provide a compact disc holder of the character described in which a stored disc is securely retained from movement therein until it is affirmatively released therefrom by depression of a protruding button which drives the ejector mechanism.

A further object of the invention is the provision of a compact disc holder of the character described which is adapted to eject a contained disc directly into the slot of a disc player by merely manually pressing the disc holder against the surface of the disc player adjacent said slot.

SUMMARY OF THE INVENTION

In accordance with the invention herein, there is provided a holder for a disc comprising: mounting means for retaining the disc within the holder; ejector means for moving the mounting means between a retracted position and an extended position; and means for releasing the disc from the mounting means when the latter is in the extended position.

According to feature of the invention, there is further provided a holder for disc having a hole at a center thereof, and a side on which information is stored, the holder comprising: a rigid box having a first and a second side: the first side being hingedly affixed to the second side; a track disposed within the rigid box; an actuator having an end accessible to the exterior of the rigid box; the actuator being movable between an open position and a closed position; a spindle slidably disposed within the track; the spindle being configured so as to conform to the hole of the disc; the spindle being capable of sliding movement along the track between a closed position within the rigid box and in which the spindle is in an upper location relative to the track, and an open position adjacent the first side of the rigid box and in which the spindle is in a lower location with respect to the track; and a rotatable arm coupled to the actuator at a first end thereof, and to the spindle at a second end thereof; whereby the actuator is capable of rotating the rotatable arm, and therewith the spindle, between the open position in which the disc may be removed from the spindle, and the closed position in which the disc is disposed within the rigid box.

According to a still further feature of the invention, there is still further provided a latch for affirmatively latching the holder in a predetermined one of its open and closed positions.

The above, and other objects, features and advantages of the present invention will become apparent from the following description read in conjunction with the accompanying drawings, in which like reference numerals designate the same elements.

Briefly stated, there is provided a disc holder comprising a rigid box which is solid on five of its six sides.

The sixth side is hinged on one end thereof to a first side, either the top or the bottom, of the compact disc holder. A spindle is mounted within the rigid box and along a track therein. The spindle is configured so as to conform to a hole at the center of the disc to be held. Upon actuation of a linear actuator, a first gear, coupled to the spindle, is rotated, thereby causing the spindle to proceed in a first direction along the track, past the sixth side of the rigid box, and to the exterior thereof. When the spindle reaches a predetermined point relative to the exterior of the rigid box, it retracts slightly, releasing the disc held thereby, so that the disc may be removed and used, as desired. A latch may be provided, for latching the spindle in each of its two positions. A spacer may also be provided, for spacing the surface of the disc on which information is stored from any surface of the rigid box with which it may come into contact.

BRIEF DESCRIPTION OF THE DRAWINGS

FIG. 3 is an enlarged cross section taken along the line 3—3 of FIG. 1;

DESCRIPTION OF THE PREFERRED EMBODIMENT

Figure 1:
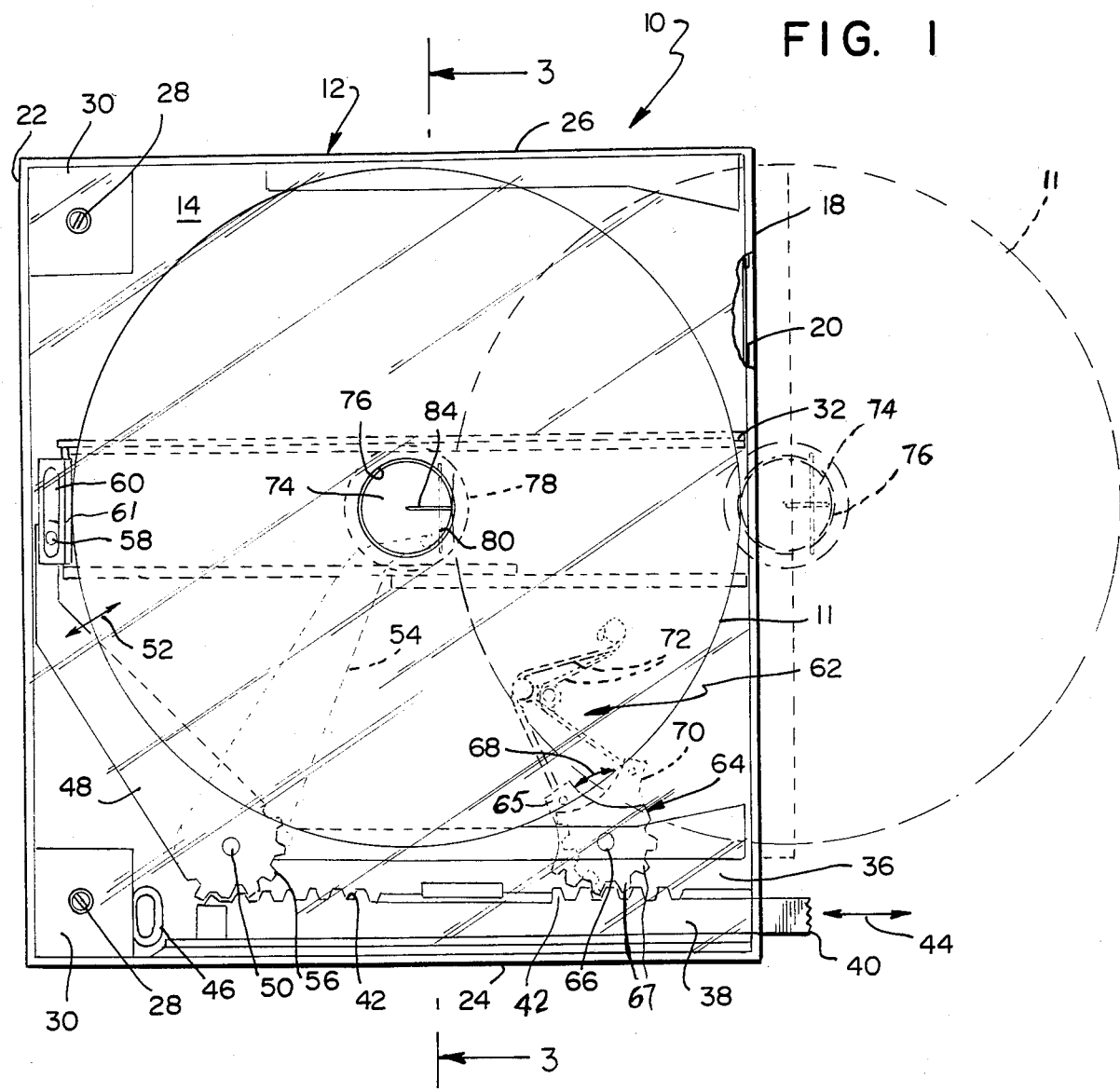
FIG. 1 is a top plan view of a holder for discs made in accordance with the present invention, illustrated with a disc with which it is to be used, with the holder for discs shown in its closed position in solid line, and in its open position in dashed line.
Figure 2:
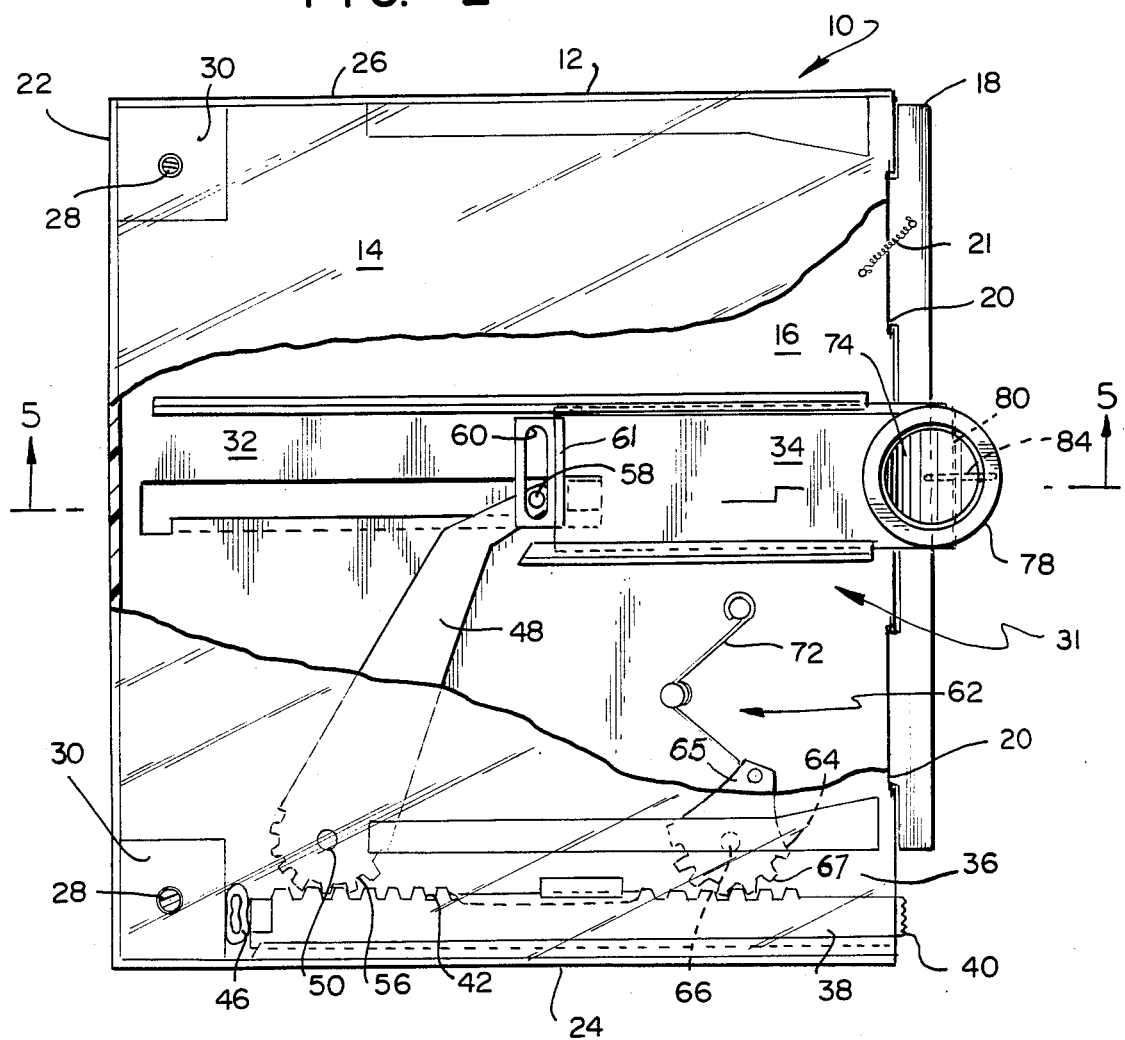
FIG. 2 is a top plan view of the disc holder similar to FIG. 1, but showing the holder in open position with the disc removed, with portions broken away to reveal inner structural detail.

Referring now to FIGS. 1 and 2, there is shown, generally at 10, a disc holder in accordance with a preferred embodiment of the invention. Disc holder 10 is used to hold a disc 11 (shown in FIG. 1) having recorded music or other data on a side thereof, and comprises generally a rigid box or casing 12, having a top wall 14, a bottom wall 16, and a front wall 18 hingedly mounted on bottom wall 16 by a pair of hinges 20. A spring 21 (FIG. 2) biases front wall 18 into the closed position shown in FIG. 1. Rigid box 12 further comprises a rear wall 22, a left wall 24 and a right wall 26.

Rigid box 12 may be made of any convenient material which is lightweight, sturdy and inexpensive. Suitable materials would be any common and well-known rigid plastic material, such as polypropylene, and may be assembled in any convenient manner, such as by glue or screws 28. Additional support may be provided by corner blocks 30.

The disc 11 is preferably a conventional digital audio recording disc made of metal and operable by laser pickup means in a player unit. Such player unit is commonly found in the dashboard of an automobile. The rigid box 12 contains an ejector assembly 31 for holding a disc and ejecting it into a receiving slot in such a player unit.

The ejector assembly 31 includes a U-shaped channel 32 having spaced parallel walls affixed to bottom wall 16 and forming therebetween a track within which a sliding arm 34 is slidably mounted.

An actuator channel 36 is also disposed within rigid box 12, along left wall 24, and an actuator 38 is slidably received within channel 36. Actuator 38 constitutes an elongated bar in the nature of a rack, having teeth or serrations 42 formed on one side thereof, and includes an end 40 projecting from the front side of rigid box 12 in the closed position of said box shown in FIG. 1, and serving as a finger piece for manual depression. Actuator 38 is mounted for linear sliding movement within channel 36, in the directions indicated by double-headed arrow 44. The sliding movement of actuator 38 toward rear wall 22 is optionally limited by a cushion 46 affixed to one corner block 30.

Ejector assembly also includes a drive lever 48 which operatively couples the rear end of actuator bar 38 to the rear end of sliding arm 34, for moving said sliding arm 34 from the retracted position shown in FIG. 1 to the extended position shown in FIG. 2. Drive lever 48 is pivotally mounted on the bottom wall 16 opposite to end 40 thereof. Drive lever 48 is mounted by a pivot 50 on bottom wall 16 for movement in a direction indicated by double-headed arrow 52 from its rearward position shown in full line in FIG. 1 to a forward position indicated in broken line as 54 in FIG. 1. Drive lever 48 at one end has a pinion-shaped portion formed with teeth or serrations 56 which mesh with the teeth or serrations 42 of actuator bar 38. A pin 58 is mounted on the opposite end of drive lever 48 and projects slidably within an elongated slot 60 in the rear end of sliding arm 34. Forwardly of slot 60, and parallel thereto, an upstanding flange 61 is mounted on sliding arm 34.

A latch 62 is also disposed within rigid box 12, and includes a toggle member 64 having at one end a short projecting arm 65, and at the other end thereof a pinion portion having teeth 67 which mesh with the teeth 42 of actuator bar 38. The toggle element 64 is mounted to turn about a pivot 66 in the directions indicated by a double-headed arrow 68 (FIG. 1) between a first position shown in solid line in FIG. 1, and a second position shown in broken line at 70 in FIG. 1, and in solid line in FIG. 2. Latch 62 is secured in either of its first and second positions by action of a butterfly spring 72 having one arm anchored to bottom wall 16 and its other arm pivotally secured to the short projecting arm 65. The spring 72 affirmatively urges toggle member 64 into either one of its first and second positions. Spring 72 will act, however, to move toggle member 64 past any intermediate position, thereby providing a definitive latching action.

A ring 78 is secured to the upper surface of sliding arm 34, at an end thereof opposite slot 60. A circular spindle 74 is mounted within the ring 78 for limited tilting movement by a pivot rod 80, in a manner to be presently described. The ring 78 and spindle 74 are sized to mount the disc 11 immovably within the rigid box 12 and to assist in ejecting the disc 11 from the box 12 when the ejector assembly 31 is actuated.

Figure 4:
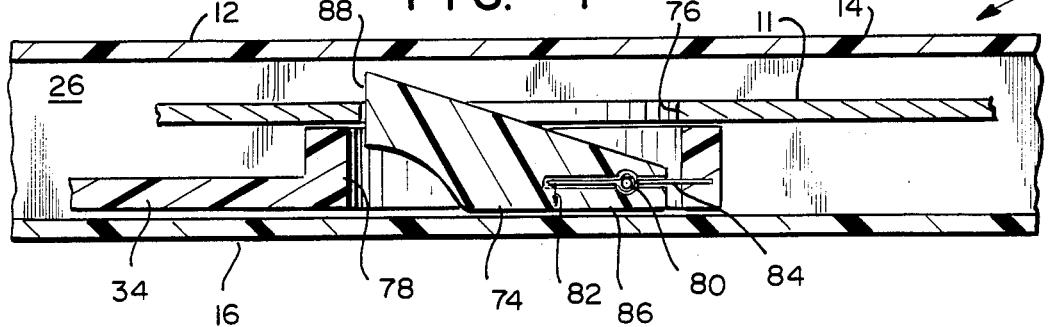
FIG. 4 is an enlarged cross section through the spindle portion of the disc holder of FIG. 1.

It will be seen in FIG. 4 that the spindle 74 is wedge shaped having a flat bottom wall 86 and an inclined flat upper portion 88 which is disposed at an acute angle to the bottom wall 86. It will also be seen that a wire spring 84 urges the spindle 74 downwardly, in the direction of arrow 82, about the pivot rod 80, so that in the retracted position of the spindle shown in FIG. 4, the spindle bottom wall 86 is biased flush against the box bottom wall 16. In this position, the inclined upper portion 88 of the spindle 74 projects upwardly well past the upper edge of the ring 78 and into the hole 76 of the disc 11, being sized and positioned to grip an edge portion of the hole 76 and retain the disc against movement in any direction.

FIG. 3 illustrates a cross section of rigid box 12, showing the disposition of disc 11 on spindle 74 and ring 78. As illustrated, when disc holder 10 is in its closed position, disc 11 is seated upon ring 78 in its area bordering the hole 76, and is supported completely within rigid box 12 by ring 78, the disc surfaces being spaced between the top and bottom walls of the box. No other portion of the underside of disc 11 contacts any other part of disc holder 10. This is important, since information carried on disc 11 should be protected from contact with any surface.

Figure 5:
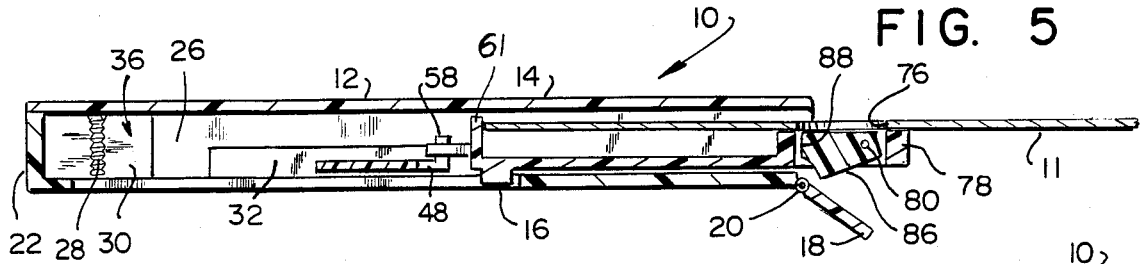
FIG. 5 is a cross section taken along the line 5—5 of FIG. 2.

When the ejector assembly 31 is actuated to its extended position shown in FIG. 5, spindle 74 moves past front side 18, and, once past the end of bottom wall 16, spindle 74 is free to pivot downwardly as urged by spring 84. This movement of spindle 74 brings its upper portion 88 out of engagement with hole 76 of disc 11, and into a disc-release position in which said top portion 88 lies flush with the top surface of ring 78, as shown in FIG. 5., thereby permitting the easy removal of disc 11 from disc holder 10.

It will be seen in FIGS. 1 and 5 that when the end 40 is depressed to toggle the sliding arm 34 to its extended position, the ring 78 and spindle 74 project outwardly of the front of box 12, with the spindle top portion lying flush with the top portion of the ring 78. In this extended position, the ring 78 has engaged the hinged front wall 18 and caused it to pivot downwardly to an open position in which it exposes the open front of the box 12. A disc 11 may now be easily inserted into the box 12. For this purpose, the disc is slipped into the open front of the box between the top surface of the ring 78 and the box top wall 14 and slid inwardly until it engages the upstanding flange 61 in the manner shown in FIG. 5. In this position, slightly more than half the disc 11 projects from the front of box 12, and its hole 76 is in precise registry with the depressed spindle 74, as shown in FIGS. 1 and 5. When the disc 11 is now pushed inwardly within box 12, it moves the sliding arm 34 inwardly of the box 12, the arm 34 carrying with it the attached ring 78 and spindle 74. When the spindle 74 reaches the front edge of the box bottom wall, its projecting lower portion contacts said front edge and is cammed upwardly thereby, so that as the spindle continues to move inwardly of the box, its bottom wall 86 is flush with the box bottom wall 16, in the manner shown in FIG. 4, and the upper portion of spindle 74 projects into and grips the hole of said disc 11. As the disc 11 continues to move inwardly of the box, the sliding arm 34 drives the actuator bar 38 outwardly of the box 12, or to the right as viewed in FIG. 1, through the drive lever 48, this movement turning the toggle element 64 to cause the disc to be snapped to a completely enclosed position by a toggle action.

Ejection of the disc 11 from the disc holder 10 is quite simple, based upon this novel construction, and is best understood by reference to FIG. 1. When in its closed position, as illustrated, disc holder 10 completely encloses disc 11 therein, and, by virtue of the sturdy nature of rigid box 12, protects disc 11 from injury. To remove disc 11 from disc holder 10, end 40 of actuator 38 is pushed towards rear wall 22. The gearing action inherently provided by the rack-and-pinion cooperation of teeth 42 and teeth 56 causes drive lever pivot arm 48 to rotate towards its extended position. Additionally, the movement of actuator 38 is resisted by latch 62 until the movement thereof is sufficient to shift latch 62 into its extended position, at which point, the resistance provided by latch 62 changes to positive movement to continue the movement of actuator 38 towards rear wall 22 until it contacts cushion 46.

The rotation of drive lever 48 caused by the movement of actuator bar 38 is translated into linear movement of sliding arm 34 in the direction opposite to that of actuator 38 by the cooperation of pin 58 and slot 60 in known fashion.

Movement of sliding arm 34 towards front wall 18 continues past front wall 18, since front wall 18 is contacted by disc 11, and caused thereby to pivot about the pair of hinges 20 into its open position (in broken line). As stated, once spindle 74 passes the end of bottom wall 16 it pivots downwardly, and thereby frees disc 11.

In this fashion, disc 11 may be removed easily from disc holder 10 with a simple push-button-type action, and this removal may be performed with one hand. When the disc holder 10 is used for loading a disc into the slot of a compact disc player mounted in an automobile, the disc may be loaded from the disc holder directly into the compact disc player. The user merely holds the disc holder with front wall 18 in registry with the receiving slot of the disc player and presses it inwardly with the finger piece 40 engaging the dashboard wall adjacent said receiving slot. As the finger piece is depressed, the disc is ejected into the receiving slot of the disc player, automatic rollers in the latter gripping and drawing the disc into the interior of the disc player.

It will be appreciated by those of ordinary skill in the art that the described problems have general applicability to holders for any type of disc, such as laser discs, records and floppy discs for computers, and so any holder useful for holding compact discs may have general utility for all types of discs without the need for any substantial modification thereof.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A holder for a disk having a hole at a center thereof, and a side on which recorded data is stored, said holder comprising:
   a rigid box having a top wall, a bottom wall and front and rear walls;
   means for hinging said front wall to one of said top wall and said bottom wall;
   a track disposed within said rigid box;
   an actuator bar having an end portion;
   means for slidably mounting said actuator bar within said box for movement between a retracted position and an extended position in which said end portion projects beyond said front wall;
   a slide member slidably disposed with in said track;
   a spindle pivotally mounted on said slide member;
   means for permitting movement of said spindle between an upper location and a lower location, said spindle being configured to conform to said hole of said disc;
   said slide member being slidable along said track to carry said spindly between a retracted position within said rigid box, and an extended position adjacent said front wall of said rigid box;

means for displacing said spindle into said upper location when said slide member is in said retracted position and into said lower location when said slide member is in said extended position;

a drive member;

cooperating means on said actuator bar and said drive member for rotating said actuator bar about a first end thereof in response to motion of said actuator bar;

means at a second end of said drive member for moving said slide member between said retracted and extended positions in response to rotation of said drive member; and said cooperating means including means for moving said slide member toward said extended position in response to depression of said end portion projecting beyond said front wall, thereby bringing said spindle to said extended position with said spindle in said lower location.

2. A holder for a disc according to claim 1 which also includes means for biasing said spindle to said lower location.

3. A holder for a disc according to claim 2 which also includes cam means for moving said spindle to said upper location in response to movement of said spindle to said retracted position.

4. A holder for a disc according to claim 3 wherein said spindle is wedge shaped, having an upper portion which projects into the hole of said disc when said spindle is in said upper location.

5. A holder for a disc according to claim 4 wherein said biasing means urges said spindle to said lower location with said upper portion out of engagement with the hole of said disc when said spindle is in said extended position.

6. A holder for a disc according to claim 1 further comprising a spacer for spacing said side of said disc on which recorded data is stored from an interior surface of said rigid box.

7. A holder for a disc according to claim 1 further comprising:

a latch; and said latch including means for affirmatively latching said spindle in at least one of said extended and retracted positions.

* * * * *